United States Patent [19]
Born et al.

[11] Patent Number: 5,930,581
[45] Date of Patent: Jul. 27, 1999

[54] METHOD OF PREPARING COMPLEX-SHAPED CERAMIC-METAL COMPOSITE ARTICLES AND THE PRODUCTS PRODUCED THEREBY

[75] Inventors: David W. Born; Richard T. Fox; Donald J. Perettie, all of Midland, Mich.

[73] Assignee: The Dow Chemical Company, Midland, Mich.

[21] Appl. No.: 08/777,984

[22] Filed: Dec. 24, 1996

[51] Int. Cl.$^6$ .................................. B22F 3/26; B22F 7/08
[52] U.S. Cl. .................................. 419/5; 419/12; 419/13; 419/14; 419/19; 419/26; 419/27
[58] Field of Search .................... 419/5, 27, 26, 419/10, 12, 13, 14, 19

[56] References Cited

U.S. PATENT DOCUMENTS

| | | | |
|---|---|---|---|
| 4,027,594 | 6/1977 | Olin et al. | 102/92.4 |
| 4,834,938 | 5/1989 | Pyzik et al. | 419/6 |
| 4,949,194 | 8/1990 | MacPherson et al. | 360/104 |
| 5,260,847 | 11/1993 | Basehore et al. | 360/106 |
| 5,264,022 | 11/1993 | Haygarth et al. | 75/255 |
| 5,503,122 | 4/1996 | Ritland et al. | 123/188.3 |
| 5,521,016 | 5/1996 | Pyzik et al. | 428/568 |

FOREIGN PATENT DOCUMENTS

| | | |
|---|---|---|
| 59-215281 | 5/1984 | Japan . |
| 61-279377 | 10/1986 | Japan . |
| WO 96/18748 | 6/1996 | WIPO . |

*Primary Examiner*—Daniel J. Jenkins

[57] ABSTRACT

The invention is a complex-shaped article, comprising an article prepared by joining at least one multi-phase ceramic-metal part and at least one shaped part of another material, wherein the theoretical density of the at least one ceramic-metal part is greater than 80 percent.

In another aspect, the invention is a process for preparing complex-shaped articles, comprising:
  (a) forming at least one ceramic-metal part;
  (b) forming at least one shaped part of another material; and
  (c) joining the at least one shaped ceramic-metal part with the at least one shaped part of another material such that a complex-shaped article is formed.

The invention is a less costly and time-consuming process for preparing complex-shaped composite articles wherein the articles are formed of two or more selected materials wherein one of the materials is a ceramic-metal composite.

9 Claims, 1 Drawing Sheet

METHOD OF PREPARING COMPLEX-SHAPED CERAMIC-METAL COMPOSITE ARTICLES AND THE PRODUCTS PRODUCED THEREBY

BACKGROUND OF THE INVENTION

The invention relates to a process for preparing complex-shaped articles of two or more selected materials and the articles produced thereby, wherein one of the materials is a ceramic-metal composite.

Ceramics are typically known as low-density materials with high hardness and stiffness; however, their brittleness limits their usefulness. Furthermore, ceramics are typically formed by creating a densified compact that requires significant and expensive grinding to achieve a final shape due to the large amount of shrinkage that occurs during densification of the compact. Metals are typically non-brittle, non-breakable materials; however, they lack some of the desirable properties of the ceramics, such as high hardness and stiffness. Therefore, combining a ceramic with a metal can create a composite material that exhibits the properties of a ceramic and a metal.

Processes for making ceramic-metal composite articles using ceramic preforms are known to those skilled in the art. PCT/US95/15794 discloses a ceramic-metal substrate and a process for making ceramic-metal substrates involving forming a ceramic preform, infiltrating the preform with a metal and coating the infiltrated substrate. However, the preparation of a wholly ceramic-metal composite article can be costly and time-consuming.

What is needed is a process for preparing complex-shaped composite articles of two or more selected materials and the articles produced thereby, wherein one of the materials is a ceramic-metal composite. What is needed is a less costly process for preparing complex-shaped composite article and the products produced thereby.

SUMMARY OF THE INVENTION

The invention is a complex-shaped, prepared by joining at least one multi-phase ceramic-metal part and at least one shaped part of another material, wherein the theoretical density of the at least one ceramic-metal part is greater than 80 percent.

In another aspect, the invention is a process for preparing complex-shaped articles, comprising:

(a) forming at least one shaped ceramic-metal part;

(b) forming at least one shaped part of another material; and (c) joining the at least one shaped ceramic-metal part with the at least one shaped part of another material, such that a complex-shaped article is formed.

The invention is a less costly and time-consuming process for preparing complex-shaped composite articles, wherein the articles comprise two or more selected materials, wherein one of the materials is a ceramic-metal composite.

DETAILED DESCRIPTION OF THE INVENTION

Figure 1:
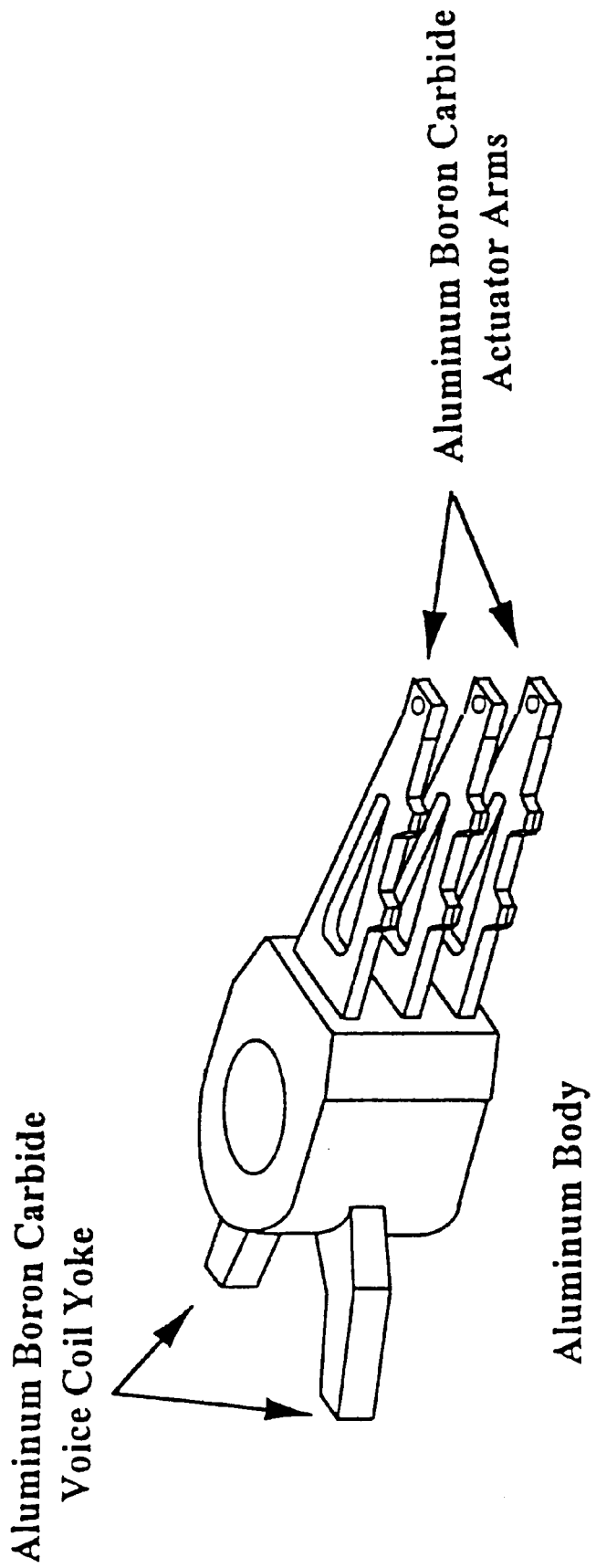

A complex-shaped article of the invention can be prepared with at least one ceramic-metal part and with at least one part of another material. The other material can include any material useful in the preparation of complex-shaped articles. Such other materials include metals, ceramics, other ceramic-metals, polymers or plastics. The parts are prepared separately and then joined together by any method known to one skilled in the art, such as bonding via friction or adhesive means, welding or swaging. Swaging involves forcing a slightly oversize sphere through a smaller diameter deformable metal sleeve which is formed or placed in an opening on one of the parts. During this procedure, the sleeve is deformed plastically, which after the sphere has passed through completely, joins the two articles intimately via friction. The metal sleeve in an opening of a ceramic-metal composite part may be formed via controlled infiltration of metal. The process of the invention can be used to prepare complex-shaped articles which are prepared by joining at least one ceramic-metal composite part with at least one part of another material. The other materials can be metals, ceramics, other ceramic-metals, polymers or plastics.

A series of steps are performed in order to achieve at least one ceramic-metal composite part of complex shape comprising at least one metal and at least one ceramic material. The first step comprises forming the selected ceramic into a desired part shape. This step can be accomplished by a variety of ceramic forming processes, as discussed hereinafter. A metal is then infiltrated into the ceramic substrate. If desired, after infiltration, a heat treatment may be performed to impart certain other mechanical properties to the complex-shaped ceramic-metal composite part. Finally, the surface(s) of the complex-shaped ceramic-metal composite part may be coated, if desired, for specific applications. For example, if a computer disk is prepared, it may be desirable to coat with a magnetic media surface for use within a computer disk drive.

At least one of the ceramic-metal composite parts used in the preparation of the article of the invention comprises at least one metal phase and at least one ceramic phase, and preferably comprises at least three phases. Preferably, each of the phases is present in an amount of at least about 2 volume percent based on the volume of the multi-phased ceramic-metal material. The ceramic-metal composite material of the part preferably has a residual-free metal content of about 2 volume percent or greater. The part preferably has a residual-free metal content of about 75 volume percent or less, more preferably about 50 volume percent or less and even more preferably about 25 volume percent or less.

The theoretical density of the ceramic-metal composite part is 80 percent or greater, wherein the theoretical density in percent is 100 times the ratio of the final measured part density over the density of the material with no porosity. Preferably, the part has a theoretical density of about 85 percent or greater, more preferably about 98 percent or greater, and even more preferably about 99.5 percent or greater, wherein the theoretical density in percent is 100 times the ratio of the final measured part density over the density of the material with no porosity. The at least one complex-shaped ceramic-metal composite part preferably has an elastic modulus high enough to prevent or reduce warping, sagging, fluttering or resonating during handling and use. Preferably, the at least one ceramic-metal composite part demonstrates an elastic modulus of about 100 GPa or greater, more preferably about 150 GPa or greater, and even more preferably about 200 GPa or greater.

The at least one complex-shaped ceramic-metal composite part of the invention preferably demonstrates flexure strength high enough to impart shock resistance and resistance to damage during handling and usage. The at least one complex-shaped ceramic-metal composite part of the invention preferably demonstrates a flexure strength of about 250 MPa or greater, more preferably about 350 MPa or greater, and even more preferably about 450 MPa or greater. If electrical conductivity is a desired property, the at least one complex-shaped ceramic-metal composite part of the invention preferably has an electrical conductivity high enough to prevent a build-up of static electricity. Preferably, if high electrical conductivity is a desired property, the complex-shaped composite part of the invention demonstrates an electrical resistivity of about $10^{-2}$ ohm-cm or less, more preferably about $10^{-4}$ ohm-cm or less and even more preferably about $10^{-5}$ ohm-cm or less.

The ceramics useful in preparing at least one ceramic-metal part are chosen based on their chemical reactivity with the chosen metal at elevated temperatures so as to increase the penetration of the metal into the pores of the ceramic. Preferable ceramics for use herein include borides, oxides, carbides, nitrides, silicides or mixtures and combinations thereof. Examples of combinations of ceramics include boron carbides, oxynitrides, oxycarbides and carbonitrides. More preferred ceramics are boron carbides, silicon carbides, titanium diborides and silicon nitrides. Even more preferred ceramics are $B_4C$, $AlB_{12}$, $SiB_6$ or $SiB_4$. A most preferred ceramic material is boron carbide, because it has a desirable low density and high stiffness, along with excellent wetting characteristics when in contact with a selected metal. The ceramic material used to form the shaped ceramic body is preferably in powder form and can contain trace metal chemically bonded to the boron, oxygen, carbon, nitrogen or silicon of the ceramic. The powdered ceramics are preferably crystalline materials having grains that are about 0.1 micrometers ($0.1 \times 10^{-3}$ mm) or greater. The powdered ceramics are preferably crystalline materials having grains that are about 50 micrometers ($50 \times 10^{-3}$ mm) or less, more preferably about 10 micrometers ($5 \times 10^{-3}$ mm) or less, and even more preferably about 5 micrometer ($1 \times 10^{-3}$ mm) or less. The crystalline particles may be in the shape of equiaxed grains, rods, or platelets.

The metals useful for infiltrating the shaped ceramic substrate are selected based on their capability of chemically reacting or wetting with a chosen ceramic material at elevated temperatures such that the metal penetrates into the pores of the ceramic. Selected metals can be taken from Groups 2, 4, 5, 6, 8, 9, 10, 13 and 14 using the new notation of the Periodic Table as published in the *Handbook of Chemistry and Physics*, CRC Press, New York, N.Y., U.S.A. (1995–1996), and alloys thereof. Preferably, metals for use herein include silicon, magnesium, aluminum, titanium, vanadium, chromium, iron, copper, nickel, cobalt, tantalum, tungsten, molybdenum, zirconium, niobium or mixtures and alloys thereof. Aluminum and alloys thereof are preferred because they exhibit high toughness, good electrical conductivity and machinability, and have good wettability with a chosen ceramic, such as boron carbide, for example. Aluminum is best employed as an alloy which provides improved wetting characteristics relative to pure aluminum. Alloys of aluminum with at least one of Cu, Mg, Si, Mn, Cr, or Zn are preferred. Alloys such as Al—Cu, Al—Mg, Al—Si, Al—Mn—Mg and Al—Cu—Mg—Cr—Zn and mixtures thereof are more preferred. Examples of such alloys are 6061™ alloy, 7075™ alloy, and 1350™ alloy, all available from the Aluminum Company of America, Pittsburgh, Pa.

Examples of preferred ceramic-metal combinations for use in forming at least one multi-phase ceramic-metal composite part comprises: $Al_xB_xC_x$, $B_4C/Al$, $SiC/Al$, $TiB_2/Al$, $SiB_x/Al$, $Si_3N_4/Al$, $SiC/Mg$, $SiC/Ti$, $SiC/Mg$—Al, $SiBx/Ti$, $B_4C/Ni$, $B_4C/Ti$, $B_4C/Cu$, $Al_2O_3/Mg$, $Al_2O_3/Ti$, $TiN/Al$, $TiC/Al$, $ZrB_2/Al$, $ZrC/Al$, $AlB_2/Al$, $AlB_{24}C_4/Al$, $AlB_{12}/Ti$, $AlB_{24}C_4/Ti$, $TiN/Ti$, $TiC/Ti$, $ZrO_2/Ti$, $TiB_2/B_4C/Al$, $SiC/TiB_2/Al$, $TiC/Mo/Co$, $ZrC/ZrB_2/Zr$, $TiB_2/Ni$, $TiC/Mo/Ni$, $SiC/Mo$, $TiB_2/TiC/Al$, $TiB_2/TiC/Ti$, $WC/Co$, and $WC/Co/Ni$. The use of the subscript "x" represents that the compound can have varying stoichiometry. More preferred ceramic-metal combinations comprise: $B_4C/Al$, $SiC/Al$, $SiB_6/Al$, $TiB_2/Al$ and $SiC/Mg$. Most preferably, the materials forming the at least one complex-shaped ceramic-metal composite part of the present invention are chemically reactive systems such as aluminum-boron-carbide. In these chemically reactive systems, the metal, after infiltration, can be depleted to form ceramic phases that modify article properties such as hardness. The aluminum-boron-carbide composite material includes at least one boron-carbide-containing phase and at least one aluminum-containing phase. Additionally, the phases may be admixed with a filler ceramic. The filler provides material for the finished part that does not adversely affect the desired properties of the ceramic-metal composite part. Filler can be selected from the group consisting of borides, carbides, nitrides, oxides, silicides, and mixtures and combinations thereof. The filler ceramic is preferably employed in an amount from 1 to 50 volume percent, based on the volume of the multi-phase ceramic-based material.

The aluminum-boron-carbide composite part preferably includes the phases of $B_4C$, $AlB_{24}C_4$, $Al_{3-4}BC$, $AlB_2$, $AlB_{12}$, $AlB_{12}C_2$, $Al_4B_{1-3}C_4$ and free metal Al. The most preferred material is a multi-phase material made of $B_4C$, Al, and at least three other ceramic phases, preferably, $AlB_{24}C_4$, $Al_3BC$, $Al_4BC$, and $AlB_2$. The $B_4C$ grains are preferably surrounded by aluminum boride and aluminum-boron-carbide. In other words, the composite article has a continuous ceramic network of aluminum boron, boron carbide, and aluminum-boron-carbide.

At least one complex-shaped ceramic-metal composite part is prepared by forming a ceramic body in the desired finished part shape and then infiltrating the ceramic body with a chosen metal. The selected ceramic is formed into the near net finished part shape. Any ceramic-forming process or processes may be used which allows the formation of shaped parts at or near net size and shape. Such ceramic-forming processes are well known to those skilled in the art, for example, injection molding, slip casting, tape casting, extrusion, green machining or chemical vapor deposition. Preferred ceramic-forming processes include injection molding, slip casting, green machining or tape casting.

The next step in the process of forming at least one ceramic-metal composite part involves infiltrating at least one shaped ceramic body with the chosen metal such that at least one shaped ceramic-metal composite part is formed. Infiltration is the process by which a metal, upon melting, forms a solid-liquid interface with a ceramic, with the metal as the liquid and the ceramic as the solid, and the metal moves into the pores of the ceramic material by capillary action. This process preferably forms a uniformly dispersed and fully dense ceramic-metal composite material. Infiltration can be performed by any method that is known in the industry, for example, U.S. Pat. Nos. 4,702,770 and 4,834,938. There are many well-known ways of infiltrating a metal into a ceramic body. Preferred methods of infiltration are heat infiltration, vacuum infiltration, pressure infiltration, and gravity/heat infiltration. When the infiltration is performed, the metal wets and permeates the pores of the ceramic that is in contact with the shaped metal body. The degree of wetting measured by the contact angle between the metal and the ceramic may be controlled by selecting temperature and time of infiltration. The temperature of infiltration is dependent upon the chosen metal and starting ceramic system. Infiltration is preferably performed at a temperature such that the metal is molten, but below the temperature at which the metal rapidly evaporates. The preferred temperature for infiltration of the selected metal into the selected ceramic depends on the melting temperature of the selected metal. For aluminum, the preferred temperature for infiltration of the selected metal into the selected ceramic is about 1200° C. or less, and more preferably from about 1100° C. or less. For example, the preferred temperature for infiltration of aluminum into a ceramic is from about 750° C. or greater, and more preferably 900° C. or greater.

For each metal, exact temperature and time of infiltration can be established by contact angle measurements to determine when wetting conditions are achieved. Infiltration time is dependent on several factors, such as packing density, pore radius, void ratio, contact angle, viscosity, surface tension and sample size. Infiltration is preferably performed until the metal-infiltrated ceramic material is substantially dense. Preferably, the infiltration time for a metal selected from the preferred class of metals and a ceramic selected from the preferred class of ceramics is about 0.1 hour or greater, more preferably about 0.5 hour or greater, and even more preferably about 1 hour or greater. Preferably, the infiltration time for a metal selected from the preferred class of metals and a ceramic selected from the preferred class of ceramics is about 24 hours or less, more preferably about 12 hours or less, and even more preferably about 6 hours or less. For example, the preferred time for infiltration of aluminum into a 1 mm thick layer of boron carbide at 1100° C. is about 10 minutes. Infiltration can be accomplished at atmospheric pressure, subatmospheric pressures, or superatmospheric pressures. The infiltration is preferably performed in an inert gas, such as argon, or a vacuum. At superatmospheric pressure, the infiltration temperature can be lowered. Infiltration is preferably performed until the ceramic-metal composite article is densified to greater than 98 percent theoretical density, more preferably to greater than 99.5 percent theoretical density. Upon completion of the infiltration step, a fully infiltrated, complex-shaped ceramic-metal composite part is formed.

After infiltration, heat treatment may be optionally performed on the ceramic-metal composite part in order to further tailor mechanical properties of the article. A preferred method of altering the microstructure of already infiltrated ceramic-metal composites involves post-infiltration heat treatments of the previously infiltrated composites. The mechanical properties that can be tailored include fracture toughness, fracture strength, stiffness and hardness. This additional step of heating the ceramic-metal composite part at a selected temperature for a selected amount of time will decrease the amount of residual-free metal and improve the uniformity of the multi-phase ceramic-based material. As a result of the post-infiltration heat treatment, a slow growth of ceramic phases takes place. It is during this heat treatment that the greatest control over the formation of multi-phases and the above-stated mechanical properties in the ceramic-metal composite part is achieved. The temperature at which the heat treatment is performed is a temperature at which the residual free metal will decrease. Furthermore, the temperature at which the heat treatment is performed is the lowest temperature at which chemical reactions in the solid state are taking place. A preferred method of altering the microstructure of already infiltrated ceramic-metal composites involves post-heat treatments of already infiltrated composites at about 650° C. or greater, more preferably about 690° C. or greater. The maximum temperature for post-heat treatment is the melting point of the metal in the ceramic-metal composite part. The time of heat-treatment is preferably long enough that the desired properties in the ceramic-metal composite part are achieved by altering the microstructure.

For example, in the case of aluminum-boron-carbide, this additional step of heat treating is preferably accomplished by heating the infiltrated body to a temperature of about 660° C. or greater, more preferably about 690° C. or greater and even more preferably about 800° C. or greater. Preferably the heat treatment is accomplished at a temperature of about 1500° C. or less, more preferably at about 1200° C or less and even more preferably about 1000° C. or less. The preferable time period for the heat-treatment of aluminum-boron-carbide is from about 1 hour or greater, more preferably about 25 hours or greater. The heat-treatment may be performed in air or an inert atmosphere such as nitrogen or argon. Preferably, the heat treatment is performed in air.

After infiltration and optional heat-treatment, the infiltrated part is cooled. Optionally, the infiltrated part may be machined and polished into a final desired shape. It may be desirable to polish the infiltrated part depending upon the end usage for the infiltrated article. For example, if the desired part is a computer hard disk, the surface of the disk should be polished to a substantially uniform average roughness value of between 1 and 2000 Å.

At least one ceramic, metal, other ceramic-metal, polymer or plastic part can be prepared and joined to at least one ceramic-metal composite part to form a complex-shaped article. Methods of preparing at least one ceramic-metal or ceramic part have been discussed previously. If it is desired to prepare a complex-shaped article from at least one metal part and at least one ceramic-metal part, a variety of ductile forming metal processes or machining can be used to form the metal part of the complex-shaped article. Specific metals to be used in the preparation of a shaped metal part have been discussed previously. In order to prepare a metal part, the selected metal is formed into the near net shape finished article shape. Any metal-forming process or processes may be used which allows the formation of complex-shaped parts at or near net size and shape. Such metal-forming processes are well known to those skilled in the art, for example, casting, molding, spinning, extrusion, drawing, forging, powder metallurgy which can include pressing and injection molding, stamping, punching, rolling, mechanical machining and chemical machining. See, for example, S. Kalpakjian, *Manufacturing Engineering and Technology* 2d Ed., Addison-Wesley Publishing Co., 1992. Preferred metal forming processes include those that form: thin metal sheet, shapes from said sheet, complex thin-walled shapes (for example, tubes) and more complex thick-walled, three-dimensional bodies. Examples of said preferred processes include spinning, extrusion, stamping, punching, rolling, mechanical machining and chemical machining.

Flat rolling to form a metal sheet is a process which reduces the thickness of a long piece of metal by compressive forces applied through a set of rolls. Rolling processes can also form, for example, seamless tubes and rings having a complex cross-sectional geometry. The metal sheet can also be formed into more complex shapes by any number of metal-forming processes such as stamping, drawing, chemical machining, spinning, punching and combinations thereof. Preferably, stamping imparts the desired end geometry to the article by shearing and compressing a metal blank (that is, metal sheet) in a die and then removing said part from the die. Another preferred process to form the shaped metal body from a metal sheet is chemical machining. Chemical machining is the removal of metal by chemical dissolution as opposed to mechanical means. The shape is formed from the metal sheet by a photochemical blanking technique analogous to photolithography techniques in forming printed wiring boards. Preferred shapes created from these processes include flat, thin, rounded disks of metal such as computer hard disks, suspension arms for computer hard disk drives, other hard articles and other complex-shaped articles such as those that require a combination of high stiffness, strength, toughness and thinness.

If the complex-shaped article to be prepared is a computer disk drive component, the components can be assembled from parts of ceramic-metal composites and other materials. For example, a computer disk drive component such as an E-block actuator can be prepared using this method. An E-block actuator comprises a bulk body with a voice coil yoke and support arms attached to the bulk body. An E-block actuator can be prepared with the bulk body of metal or another material which is less expensive while the support arms and VCM yoke can be prepared from a ceramic-metal composite in order to lower cost and improve vibration performance and stiffness characteristics of the article as a whole.

If it is desirable to prepare a complex-shaped part from at least one polymer or plastic part, and at least one ceramic-metal part, a variety of forming processes can be used to form the plastic part of the complex-shaped article. Any plastic or polymer may be used which can be formed into the desired part shaped. Such plastics can include any plastic capable of being shaped or molded with or without the application of heat. Such polymers can include any organic or inorganic polymers and including any combined with other ingredients, such as curatives, fillers, reinforcing agents, colorants, or plasticizers. Examples of such plastics and polymers are thermoplastic elastomers, nylons, polyvinyl chlorides, fluorocarbon resins, polyurethanes, acrylate resins, acetals, polycarbonates, ABS resins PPO/styrene, filled polymers, liquid crystalline polymers, semicrystalline polymers or combinations thereof. Preferred plastics and polymers include thermoplastic polymers such as polyethylene, polystyrene, polypropylene, polybutylene terephthalate, polycarbonates, polyphenylene sulfide, crystalline polymer, and semicrystalline polymers. Examples of thermoplastic polymers, crystalline and semicrystalline polymers include General Electric's Ultem 1010™, Shell's Carilon™, and Amoco's Amodel™. Fillers can be used in the thermoplastic, liquid crystalline or semicrystalline polymers. Examples of such fillers include carbon, mica, talc or glass. Any plastic or polymer forming process known to one skilled in the art can be used. Such forming processes are injection molding, transfer molding, extrusion, rotational molding, blow molding, thermoforming, casting, compression molding, mechanical machining, forging, or form molding. See, for example, *Manufacturing Processes for Engineering Materials*, S. Kalpakjian, Addison-Wesley Publishing Co., 1984. Preferably, injection molding can be used to prepare the plastic or polymer part.

Once the at least one ceramic-metal composite part and the at least one metal, ceramic, other ceramic-metal, polymer or plastic part have been formed, they can be joined together by any method known to one skilled in the art, such as bonding via friction or adhesives, welding or swaging. Typically, it is difficult to swage a material such as a ceramic-metal composite due to its relatively low toughness which leads to localized fracturing of the part during attachment. However, by initiating metal infiltration at the site of attachment on the ceramic-metal part or by depositing excess metal at the swaging site, the higher toughness of the metal can be utilized locally to permit part attachment while retaining the higher stiffness qualities of the ceramic-metal composite in the part as a whole. The sleeve through which the swaging sphere is inserted can be formed during the initial forming of the ceramic substrate with the excess metal occurring during infiltration. The swaging sleeve is formed to be larger than necessary due to the need to accommodate the inserted sphere after metal infiltration has occurred. Typical infiltration procedures call for the use of up to 25 volume percent excess aluminum to ensure complete fill of the debindered article porosity and to account for uncontrolled vaporization losses. This commonly results in residual aluminum surface deposits in the area from which infiltration was initiated. To achieve the necessary excess aluminum at the swaging site, infiltration is performed to create the ceramic-metal composites as described hereinbefore. The infiltration is initiated from the site where excess metal is desired. The amount of excess metal left after infiltration is controlled by the infiltration time and amount of starting metal. Finishing can then be performed via electro discharge machining or simple drilling to prepare the site for swaging, thereby producing the required inner diameter. If necessary, the thickness of the metal can be adjusted by any machining method known to one skilled in the art. The inner diameter thickness and the outer diameters of the swaging sleeves are dependent on the ductility of the chosen materials and are known to one skilled in the art. Furthermore, swaging can be performed before the articles are completely assembled. For example, an individual actuator arm can be swaged onto the support suspension assembly before assembly of the E-block as a whole.

Finally, a coating material can be contacted with the complex-shaped article in order to impart a modified surface to the article. The coating can be applied to at least one surface of the article. A suitable coating material, for example, is a nickel-phosphorus coating; however, other types of coatings can be used such as, for example, other metals and polymers. The coating method may be any that provides dense coating, such as atomic deposition, particulate deposition, bulk coating, or surface modification. Preferably, the methods used to coat the article are electroplating, electroless plating or atomic deposition. The coating itself may be further treated to provide a textured surface either over the entire surface or a portion of the surface. The further treatment may be accomplished by techniques such as mechanical techniques, chemical or optical techniques, electrical techniques, or a combination thereof.

The process for preparing the complex-shaped composite articles allows the creation of complex-shaped composite articles. Preferred products of this invention are computer hard disk drive components, wherein the material has a high hardness, a high wear resistance, a high fracture toughness, a high damping capability, a low density, and a high specific stiffness and is electrically conductive. Examples of computer hard disk drive components are hard disks, E-block actuators, actuators, sliders, load beams, voice coil motor (VCM) yokes, support arms, actuator bearings, spacers, clamps, spindles, ball bearings, thrust bearings, journal bearings, base plates, housings or covers. The complex-shaped ceramic-metal composite articles of the invention are preferably computer disk drive components. Preferably, the disk drive components are computer hard disks, VCM yokes, actuator arms, E-block actuators, sliders, load beams, support arms, actuator bearings, spacers, clamps, spindles, ball bearings, thrust bearings, journal bearings, base plates, housings or individual actuator arms which support suspension assemblies or covers. More preferably, the disk drive components are base plates, E-blocks, VCM yokes or individual actuator arms which support suspension assemblies.

SPECIFIC EMBODIMENTS

The following is included for illustrative purposes only and are not intended to limit the scope of the claims.

EXAMPLE 1

Assembled Actuator From Ceramic Metal Composite and Conventional Materials

Preparation of Voice Coil Yoke

Boron carbide powder (ESK 1500 and approximately 5 micron grades) were blended and dispersed within an aqueous slip. The mixture was rolled for about 12 hours with boron carbide media, following screening to remove particle agglomerates. The aqueous slip was cast on a porous plaster base and dried. Dried stock samples (about 4.5×4.5 by 0.6 inch) had about 70.6 percent theoretical density. These samples were subjected to high temperature heat treatment in a graphite element furnace, followed by infiltration in a vacuum with a 1350 grade aluminum alloy. Further heat treatments were applied in air at lower temperatures to develop mechanical properties (stiffness modulus E about 352 GPa). The densified aluminum-boron-carbide ceramic composite material was machined via electro-discharge machining (EDM) into voice coil yoke geometries, about 0.100 inch thick, 0.8 inch long, 1.072 inch wide, with cantilevered arms tapering from about 0.109 to 0.174 inch thick at the body.

Preparation of E-Block Individual Actuator Support Arm

Boron carbide powder (ESK 1500F grade) was dispersed in multi-component solvent-based tape-casting formulation, and rolled with boron carbide media to break particulate agglomerates. Casting mixture was about 57 percent boron carbide particulate volumetric content. The mixture was cast into flat tape form, and allowed to air dry. The tape was cut into rectangles about 2.7 by 5.25 cm and settered between flat aluminum oxide and aluminum nitride plates. Assemblies were placed in the furnace and debindered at about 35° C./hr to about 625° C. (furnace setpoint) in flowing nitrogen, about ⅓ cubic foot furnace volume. Boron carbide tapes were removed and infiltrated with aluminum at temperatures exceeding 1050° C. for 2 hours. The Aluminum-boron-carbide ceramic composite plates were removed, ground to about 0.04 inch thick, and machined to individual E-block actuator support arm geometries, with dimensions about 1.314 inch long, with an about 0.5 to 0.165 inch taper from back to front. Holes were cut at the arm tips to accommodate suspension mounting, and also within the arm center region to remove mass and further lighten the structure weight. Final part stiffness modulus E was about 262 GPa.

Assembly of Actuator

An aluminum-boron-carbide (Al—B—C) voice coil yoke fabricated via methods described above and a set of three Al—B—C E-Block individual actuator arms intended to support suspension assemblies fabricated according to methods described above are assembled to comprise an E-Block made from high performance ceramic metal composites and conventional materials such as metal. Stock 6061 aluminum is shaped via conventional metal milling/machining techniques, in conjunction with plunge EDM methods to form a bulk E-block body having a through-hole, to house the actuator bearing/sleeve, and cavities for insertion of the Al—B—C voice coil yoke and support arm set. An epoxy resin, preferably electrically conductive, such as Able-Bond™ 965-1L (Ablestick Laboratories, 20021 Susana Road, Rancho Dominguez, Calif., 90221) is applied to the surfaces of the Al—B—C components in contact with the surfaces of the aluminum bulk actuator body; the components are assembled into the actuator body, and cured at 150° C. for 2 hours. The assembled E-Block appears as in FIG. 1.

What is claimed is:

1. A process for preparing complex-shaped articles, comprising:
   (a) infiltrating a ceramic body with metal under conditions sufficient to form a ceramic-metal part having, at a point for joining, a layer of metal on the surface of the body;
   (b) forming at least one part of another material; and
   (c) joining at least one part from step (b) with at least one part from step (a) by a process comprising at least one technique selected from the group consisting of swaging and friction welding, said joining being at the point for joining such that a complex-shaped article is formed.

2. The process of claim 1 wherein the material of the part of another material is metal, ceramic, other ceramic-metal or plastic.

3. The process of claim 1 wherein the ceramic-metal part is $B_4C/Al$, $SiC/Al$, $TiB_2/Al$, $SiB_x/Al$, $Si_3N_4/Al$, $SiC/Mg$, $SiC/Ti$, $SiC/Mg$-$Al$, $SiBx/Ti$, $B_4C/Ni$, $B_4C/Ti$, $B_4C/Cu$, $Al_2O_3/Mg$, $Al_2O_3/Ti$, $TiN/Al$, $TiC/Al$, $ZrB_2/Al$, $ZrC/Al$, $AlB_{12}/Al$, $AlB_2/Al$, $AlB_{24}C_4/Al$, $AlB_{12}/Ti$, $AlB_{24}C_4/Ti$, $TiN/Ti$, $TiC/Ti$, $ZrO_2/Ti$, $TiB_2/B_4C/Al$, $SiC/TiB_2/Al$, $TiC/Mo/Co$, $ZrC/ZrB_2/Zr$, $TiB_2/Ni$, $TiB_2/Cu$, $TiC/Mo/Ni$, $SiC/Mo$, $TiB_2/TiC/Al$, $TiB_2/TiC/Ti$, $WC/Co$, or $WC/Co/Ni$.

4. The process of claim 2 wherein the material of the part of another material is the ceramic, said ceramic being a boride, oxide, carbide, nitride, silicide or combinations thereof.

5. The process of claim 2 wherein the material of the part of another material is the metal, said metal being silicon, magnesium, aluminum, titanium, vanadium, chromium, iron, copper, nickel, cobalt, tantalum, tungsten, molybdenum, zirconium, niobium or combinations thereof.

6. The process of claim 2 wherein the material of the part of another material is the plastic, said plastic being selected from the group consisting of thermoplastic elastomers, nylons, polyvinyl chlorides, fluorocarbon resins, polyurethanes, acrylate resins, acetals, polycarbonates, ABS resins PPO/styrene, glass filled polymers, liquid crystalline polymers, semicrystalline polymers or combinations thereof.

7. The process of claim 4 wherein the ceramic is formed by injection molding, slip-casting, tape-casting, extrusion, green machining or chemical vapor deposition.

8. The process of claim 5 wherein the metal is formed by casting, molding, spinning, extrusion, drawing, forging, powder metallurgy, stamping, punching, rolling, mechanical machining and chemical machining.

9. The process of claim 6 wherein the plastic is formed by injection molding, transfer molding, extrusion, rotational molding, blow molding, thermoforming, casting, compression molding, mechanical machining, forging, or form molding.

\* \* \* \* \*